Dec. 8, 1925.
S. W. CRAMER
1,564,949
HUMIDIFIER
Filed Dec. 13, 1924
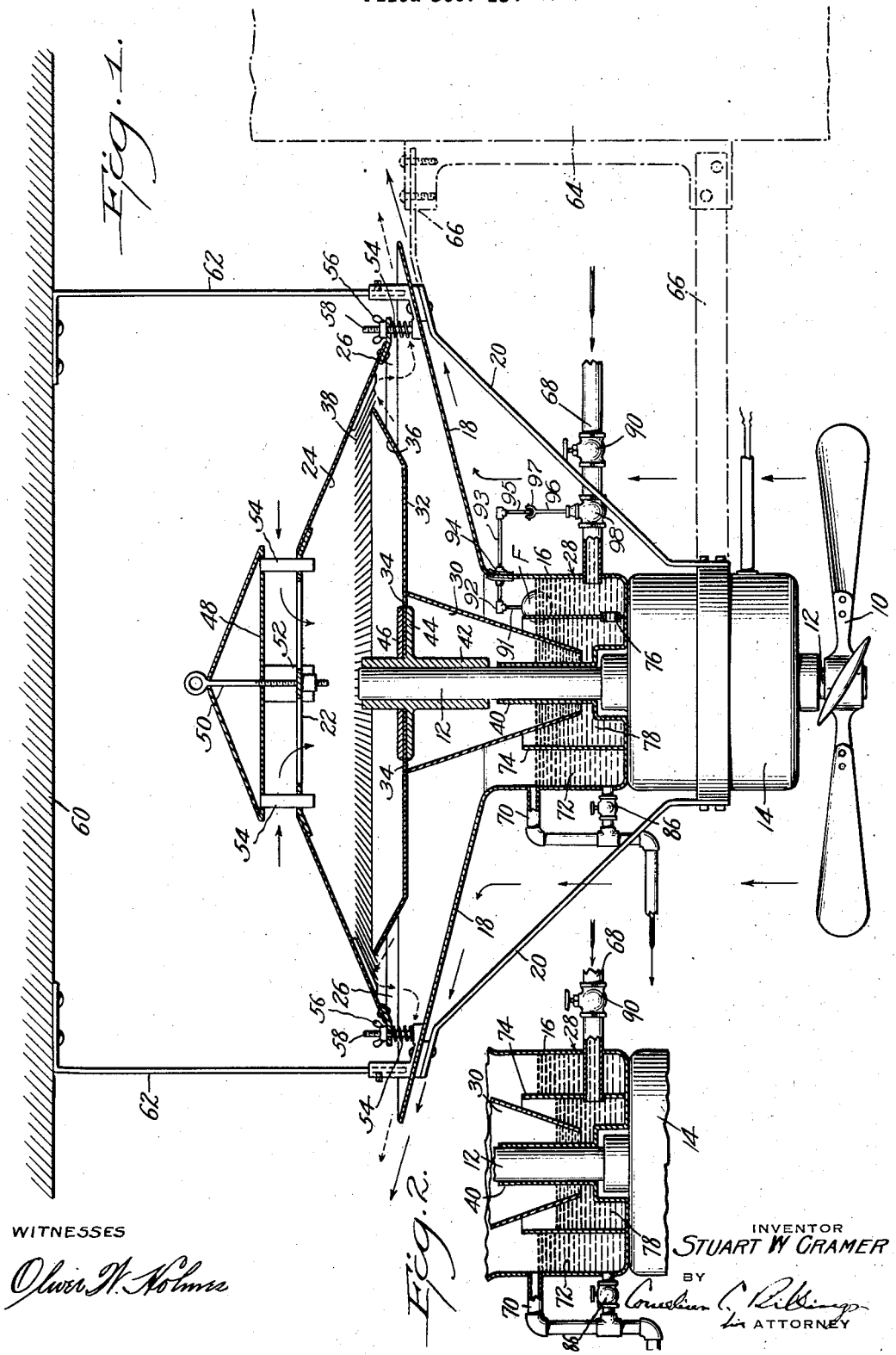
WITNESSES
INVENTOR
STUART W. CRAMER
BY
ATTORNEY Patented Dec. 8, 1925.

1,564,949

UNITED STATES PATENT OFFICE.

STUART W. CRAMER, OF CRAMERTON, NORTH CAROLINA.

HUMIDIFIER.

Application filed December 13, 1924. Serial No. 755,662.

*To all whom it may concern:*

Be it known that I, STUART W. CRAMER, a citizen of the United States, and a resident of Cramerton, county of Gaston, State of North Carolina, have invented certain new and useful Improvements in Humidifiers, of which the following is a specification.

This invention relates to a humidifier and, more particularly, to a method of and apparatus for creating and distributing a mist of water and increasing the water vapor content in the atmosphere about the apparatus.

In the usual type of humidifiers, water to be absorbed in the atmosphere is sprayed into a draught of air which is moving unidirectionally, either downwardly or horizontally. Accordingly, the tendency of the droplets or particles of sprayed water to fall or settle from the draught is aided by the movement of the draught. This not only lessens the time during which the water may evaporate from the falling drops but creates an objectionable spattering or splashing of the water on the floor or other surfaces about the apparatus.

An object of my present invention is to provide a method and apparatus for humidifying in which the tendency of the water particles or droplets of the mist to fall or settle out of the draught of air in which they are carried is resisted or opposed, and in which a wide distribution of the mist is obtained in a direct manner.

Another object of the invention is to provide a humidifier in which the projection into the air of particles of too large a size to be carried therein is avoided.

A further object of the invention is to provide a humidifier in which the capacity may be readily controlled or adjusted.

A still further object of the invention is to provide a humidifier in which the mist is formed in a body of air moving at a lower velocity than that in which the mist is to be distributed to eliminate particles which cannot be carried in the distributing draught.

With these and other objects in view, the invention comprises the method and apparatus described and set forth in the following specification and claims.

The various features of the invention are illustrated in the accompanying drawings in which:

Fig. 1 is a vertical sectional view of a humidifier embodying a preferred form of the invention, and Fig. 2 is a vertical sectional view of a portion of a modified form of embodiment of the invention employing an alternative water supply arrangement.

In my present invention, an upward draught of air is created and is deflected and spread radially outwardly in a substantially flat stream. A secondary, slower, current of air is created and entrained in the outwardly moving draught of air and in this secondary current of air is generated a mist, which is then drawn with the secondary current of air into the outwardly moving draught of air and thus distributed throughout the surrounding atmosphere. To form this mist, a stream of water is drawn from a source of supply to the surface of a rapidly rotating plate and is thrown outwardly by centrifugal action to the edge of the plate and projected as a fine mist into the secondary current of air, passing above the edge of the plate. The smaller, lighter, particles of water thrown from the edge of the plate are carried by the entrained current of air into the main draught of air while the larger drops are projected onto a receiving surface from which they may flow back to the source of supply of the water. The capacity of the apparatus may be controlled by controlling the volume or velocity of the secondary current of air through a suitable damper arrangement. With this arrangement, only those particles are carried into the distributing draught of air, which are light enough to be carried therein and the tendency for the particles to settle out of the draught is opposed by the upward and outward movement of the draught.

Referring more particularly to the accompanying drawings, an upward draught of air is created by a fan 10 mounted on and driven by a vertical shaft 12 depending downwardly from a motor 14. The current of air generated by the fan 10 passes upwardly about a cylindrical surface 16 and is then deflected and spread outwardly and slightly upwardly by an upwardly and outwardly flaring inverted conical surface 18, extending from the upper edge of the cylindrical surface 16, from the outer edge of which the motor and fan are mounted by downwardly and inwardly converging arms 20.

As the draught of air passes from beneath the outer edge of the surface 18, it entrains air from the upper side of the surface and thus draws a secondary current of air of lower velocity, in which a mist of water is formed and thence drawn into the outwardly flaring draught of air supplied by the fan 10. This secondary current of air is drawn through an opening 22 in the upper part of a frustro-conical surface of plate 24 and passes downwardly along the under surface of this plate and under the lower edge thereof, which is slightly spaced above the upper surface of the conical plate 18 to form an annular passageway 26 through which the secondary current of air is drawn in a thin annular sheet.

A fine spray or mist of water to be carried into the draught of air from the fan 10 is formed in the secondary air immediately before it is drawn through the passageway 26 and entrained in the main air draught. To this end, a continuous stream of water is drawn, from a supply cup or pan 28, formed in the lower part of the cylindrical surface 16, upwardly by centrifugal action over both the outer and the inner surface of an inverted, frustro-conical member 30 depending from a rotating, horizontal spraying disc 32 and extending beneath the surface of the water in the cup 28. The water being drawn upwardly inside of the frustro-conical member 30 flows through openings 34 in the disc 32, within the periphery of the member 28 and then flows outwardly over the surface of the plate. As the water reaches the outer edge of the disc 32 it is deflected upwardly and outwardly over an upwardly bent edge portion 36 and thrown against a corrugated surface 38 formed on the under side of the frustro-conical plate 24. As the water is carried to and impacts with the inner surface of the bent edge portion 36 and thrown from the edge of the flange disc 32 it is broken into a fine spray or mist, the lighter, smaller, particles of which remain suspended and are carried in the secondary air current into the main air draft, while the larger, heavier particles, which would settle out of the air more quickly, are caught on the corrugated surface 38 and thus prevented from being carried into the air draught and later deposited on neighboring surfaces. As the lighter suspended droplets of water are carried into the main draught of air, which has a greater velocity than the secondary current in which they were formed, they are carried upwardly and outwardly therein, the direction of movement of the draught being such as to buoy up the droplets until they are completely evaporated, and to provide a wide distribution which facilitates rapid evaporation from the particles. The drops caught on the corrugated surface 38 fall downwardly upon the upper surface of the plate 18 and thence flow back into the pan 28.

The plate 32 may be supported and rotated in any suitable manner but is preferably supported by extending the shaft 12 upwardly from the motor 14 through a surrounding collar 40 projecting upwardly from the bottom of the pan 28 and mounting on the upper end of the shaft a collar 42 having a horizontal flange 44 on which the disc 32 is mounted and secured by means of a washer 46.

The capacity of the humidifier may be controlled or adjusted by controlling the velocity of the entrained or secondary air current drawn through the opening 22. For this purpose, a cap 48 is provided above the opening 22 and is supported at an adjustable distance thereabove by means of a threaded supporting post 50 threaded in a spider 52 spanning the opening 22. The cap is, moreover, guided by means of a series of vertical guide posts 54. By raising or lowering the cap 48 the size of the entrance opening for the secondary air current may be adjusted. The conical plate 24 is also so supported from the plate 18 as to be adjusted vertically to vary the annular opening 26 and the distance of the corrugated surface 38 from the outer edge of the disc 32, thereby varying the area in which the mist is formed and the velocity of the air passing therethrough. For this purpose, the conical plate 24 is supported at its outer edge from the outer edge portion of the plate 18 by means of supporting springs 54 and held in position by means of wing nuts 56 threaded on bolts 58 projecting upwardly from the outer edge portion of the plate 18. By screwing down the nuts 56 the springs 54 are compressed and the plate 24 brought closer to the plate 18. The entire apparatus may be suspended from a ceiling 60 by means of depending hangers 62 or from a supporting post 64 by means of brackets 66.

Water may be supplied to the cup 28 in any suitable manner. In the preferred form of the invention, as shown in Fig. 1, a supply of water is continuously admitted through a pipe 68 provided with a hand operated by-pass valve 90 and the level of water in the cup is maintained constant by permitting the excess of water to overflow through an overflow pipe 70. The water supplied by the pipe 68 is received directly in an outer annular chamber 72 formed in the cup 28 by means of a circular partition or wall 74. A float valve structure is provided in the compartment 72, which consists of the float F from which projects a rod 91 connected by a suitable joint 92 to a rod 93, which passes through a flexible joint 94 in the wall 16 which is joined to the valve 98 by rods 95 and 96 connected together by a universal joint 97. The float will rise and fall with the water in the compartment 72, thus closing and opening the valve 98 at a predetermined water level. From the outer compartment 72 the water is admitted through an opening 76 to an inner compartment 78 within the wall 74 into which the lower end of the cone 30 dips. A by-pass valve 86 is also provided between the lower portion of the cup 28 and the overflow pipe 70 for the purpose of draining the cup at intervals for cleaning.

Instead of the arrangement shown in Fig. 1, however, an alternative arrangement shown in Fig. 2 may be used. In this arrangement of the apparatus, the pipe 68 opens directly into the inner compartment 78 and all of this water is carried upward and over the surface of the plate 32 and the portion that is thrown against the corrugated surface 38 which is not evaporated falls onto the surface 18 and flows back to the outer compartment 72 and thence through the overflow pipe 70 to a drain. With this arrangement a constant and systematic circulation of water through the apparatus is provided. The inlet pipe 68 is provided with a hand operated by-pass valve 90, and a by-pass valve 86 is provided between the cup 28 and the overflow pipe 70 for draining purposes, as in the construction shown in Fig. 1.

With the above described method and apparatus, therefore, the water is divided into a very fine mist, from which the larger particles which can not be readily carried for a sufficient distance are removed and returned to the source of supply. The remaining fine mist is then carried directly outwardly and spread throughout a wide area into an unsaturated or normally conditioned atmosphere into which water vapor may readily and rapidly evaporate from the drops. The great merit therefore of the invention is to distribute finely subdivided moisture, buoyed up on a draft of dry air, which supports it, distributes it, and evaporates it, the moisture being in an extremely subdivided state before it mixes with the said draft of air. The humidifying action is thereby rendered very efficient and effective and any splashing and spattering of the water is avoided.

As changes of construction could be made within the scope of my invention, it is intended that all the matter contained in the above description or shown in the accompanying drawings, shall be interpreted as illustrative and not in a limiting sense.

Having described my invention, what I claim and desire to secure by Letters Patent is:

1. A method of humidifying an atmosphere, which comprises forming a mist of water and a slowly moving current of air, and then conveying and throwing said air and mist to and into another separately produced and more rapidly moving draught of normally conditioned air.

2. A method of humidifying an atmosphere, which comprises forming a mist of water and a slowly moving current of air, and then conveying and throwing said air and mist to and into another separately produced and more rapidly moving, and upwardly spreading draught of normally conditioned air.

3. A method of humidifying an atmosphere, which comprises forming a mist of water and a slowly moving current of air, and then centrifugally conveying and throwing said air and mist to and into another more rapidly moving and upwardly spreading draught of normally conditioned air.

4. A method of humidifying an atmosphere which comprises forming a draught of rapidly moving normally conditioned air, forming a mist of water and another slowly moving current of air, removing the larger particles of moisture from said mist, conveying and throwing said air and mist uninfluenced by but to and into the draught of rapidly moving air, then spreading the merged draught of air and contained mist throughout said atmosphere.

5. A method of humidifying an atmosphere, which comprises, forming a mist of water and a slowing moving current of air, removing the larger particles from said mist, conveying and throwing said air and mist into another and more rapidly moving draught of air, and spreading the two draughts of air and contained mist with increasing momentum radially and inclined upwardly from the horizontal throughout said atmosphere.

6. A method of humidifying an atmosphere which comprises centrifugally forming a mist of water and a slowing moving current of air, producing another separate and independent rapidly moving draught of air, centrifugally conveying and throwing said mist uninfluenced by the rapidly moving draught of air to and into said rapidly moving draught of air, spreading the combined draughts of air and contained mist throughout said atmosphere.

7. A method of humidifying an atmosphere, which comprises, centrifugally throwing water into a slowing moving current of air, removing the larger particles of water from said current of air, and centrifugally forcing said current of air, and the water therein to and into a separately produced and more rapidly and upwardly moving spreading current of air.

8. A method of humidifying an atmosphere, which comprises, centrifugally throwing water into a slowly moving current of air, controlling the velocity of said current of air, removing the larger particles of water from said current of air and centrifugally forcing said current of air and the mist therein to and into a separately produced and more rapidly and upwardly moving, spreading draught of normally conditioned air.

9. A method of humidifying an atmosphere which comprises creating a draught of air, spreading said draught of air outwardly into a thin relatively forceful draught, forming a mist and a more slowly moving independently produced current of air, conveying the mist by centrifugal force uninfluenced by the draught of air first above mentioned to and into the first above mentioned draught of air.

10. A method of humidifying an atmosphere, which comprises, creating a draught of air of substantial force and volume, spreading said draught of air outwardly in a thin, substantially horizontal, draught forming a mist and a more slowly moving current of air of lesser force and volume, removing the larger particles from said current of air, and centrifugally forcing the resulting mist into the draught of air with increasing momentum.

11. Apparatus of the type described which comprises means for forming and directing a current of air of relatively great force and volume radially outward, means for forming a mist and another more slowly moving current of air, and means for entraining and independently forcing said mist and air uninfluenced by the first named means into the current of air first above mentioned.

12. Apparatus of the type described which comprises, means for generating and directing a current of air upwardly and directing it radially outward in a thin sheet, means for forming a mist and another current of air adjacent said outwardly moving current of air and for entraining and centrifugally throwing said mist into said outwardly moving current.

13. Apparatus of the type described which comprises a flaring surface, means for forming a draught of air having relatively great force and volume adjacent said surface and directed towards the base thereof, and means separate from and uninfluenced by the first named means for forming a mist and for conveying said mist and delivering it to and into the draught of air first above mentioned.

14. Apparatus of the type described which comprises, a flaring surface, means for directing a draught of air of substantial force and volume along the surface and towards the base of said flaring surface, means independent of the first named means and uninfluenced thereby for forming a mist and for carrying it to a position to be thrown and drawn into the said draught of air leaving the base of said flaring surface, and means for removing the larger drops from said mist prior thereto.

15. Apparatus of the type described which comprises, an inverted flaring surface, means for directing a draught of air upwardly against said flaring surface, means for forming a mist at the upper edge of said flaring surface in position to be thrown and drawn into the draught of air passing the upper edge of said flaring surface.

16. Apparatus of the type described which comprises means for producing a draught of air of substantial force and volume, means for forming said draught of air into a thin sheet and for directing the same radially outward, a rotatably mounted disc provided with a beveled periphery, an annular surface spaced from and adjacent to the periphery of said disc, and means for supplying water to a surface of said disc, and for causing its impact against the surface of the beveled portion thereof.

17. Apparatus of the type described which comprises means for producing a draught of air of substantial force and volume, means for forming said draught of air into a thin sheet and for directing the same radially outward, a rotatably mounted disc provided with a beveled periphery, an annular surface spaced from and adjacent to the periphery of said disc, means for supplying water to the upper surface of said disc and beveled portion thereof.

18. Apparatus of the type described which comprises means for producing a draught of air of substantial force and volume, means for forming said draught of air into a thin sheet and for directing the same radially outward, a rotatably mounted disc provided with a beveled periphery and an annular corrugated surface above and spaced from the periphery of said disc, means for supplying water to the inner side of the base of the beveled portion of the disc.

19. Apparatus of the type described which comprises, an inverted conical surface, means for directing a draught of air upwardly against the said conical surface, means for forming a mist at the upper edge of said conical surface in position to be entrained by air passing the upper edge of said conical surface, and means for removing the larger drops from said mist.

20. Apparatus of the type described which comprises, an inverted conical surface, means for directing a draught of air upwardly against said conical surface, a rotatably mounted horizontal disc above said conical surface, and means for supplying water to the surface of said disc to be projected therefrom and entrained in said draught of air.

21. Apparatus of the type described which comprises, an inverted conical surface, means for directing a draught of air upwardly against said conical surface, a rotatably mounted horizontal disc above said conical surface and having an upwardly turned outer edge portion, an annular corrugated surface above and spaced from the edge of the said disc, and means for supplying water to the surface of said disc.

22. Apparatus of the type described which comprises, an inverted conical surface, a fan for directing a draught of air upwardly against said conical surface, a rotatably mounted disc above said conical surface and having an upturned edge portion a frustro-conical surface above said disc and having an annular corrugated surface spaced from the edge of said disc, and means for supplying water to said disc.

23. Apparatus of the type described which comprises, an inverted conical surface, a fan for directing a draught of air upwardly against said conical surface, a rotatably mounted disc above said conical surface and having an upturned edge portion, a frustro-conical surface above said disc and having an annular corrugated surface spaced from the edge of said disc, means for supplying water to the surface of said disc, and a cap adjustably mounted above the upper open end of said upper frustro-conical surface.

24. Apparatus of the type described which comprises, an inverted conical surface, a fan for directing a draught of air upwardly against said conical surface, a rotatably mounted disc above said conical surface and having an upturned edge portion, a water supply pan at the lower end of said inverted conical surface, means for drawing water from said pan to said disc, a frustro-conical surface above said disc and having an annular corrugated surface spaced from the edge of said disc, and a cap adjustably mounted above the upper open end of said upper frustro-conical surface.

25. Apparatus of the type described which comprises, an inverted conical surface, a fan for directing a draught of air upwardly against said conical surface, a rotatably mounted disc above said conical surface, and having an upturned outer edge portion, a water supply pan at the lower portion of said conical surface, an inverted frustro-conical surface secured to said disc and dipping into said cup, a frustro-conical surface spaced above said inverted conical surface and having a corrugated surface spaced from the edge of said disc, and a cap vertically adjustable over the upper open end of said frustro-conical surface.

STUART W. CRAMER.